(12) United States Patent
Kupershmidt

(10) Patent No.: US 9,146,151 B2
(45) Date of Patent: Sep. 29, 2015

(54) PULSE LABELING FOR HIGH-BANDWIDTH FIBER-OPTIC DISTRIBUTED ACOUSTIC SENSING WITH REDUCED CROSS-TALK

(75) Inventor: Vladimir Kupershmidt, San Francisco, CA (US)

(73) Assignee: Optasense, Inc., Santa Clara, CA (US)

( * ) Notice: Subject to any disclaimer, the term of this patent is extended or adjusted under 35 U.S.C. 154(b) by 834 days.

(21) Appl. No.: 13/300,503

(22) Filed: Nov. 18, 2011

(65) Prior Publication Data

US 2012/0297883 A1 Nov. 29, 2012

Related U.S. Application Data

(60) Provisional application No. 61/422,104, filed on Dec. 10, 2010, provisional application No. 61/415,301, filed on Nov. 18, 2010.

(51) Int. Cl.
*G01H 9/00* (2006.01)
(52) U.S. Cl.
CPC ..................................... *G01H 9/004* (2013.01)
(58) Field of Classification Search
CPC ..... G01N 29/2418; G01H 9/00; G01H 9/002; G01H 9/004
USPC .......................................................... 73/643
See application file for complete search history.

(56) References Cited

U.S. PATENT DOCUMENTS

| 6,282,334 | B1 | 8/2001 | Hodgson et al. |
| 6,437,907 | B1 | 8/2002 | Yoon et al. |
| 6,545,785 | B1 | 4/2003 | Heflinger et al. |
| 7,480,056 | B2 | 1/2009 | Waagaard et al. |
| 2006/0139652 | A1 | 6/2006 | Berthold |
| 2007/0046928 | A1* | 3/2007 | Chen et al. ................... 356/73.1 |
| 2008/0088846 | A1 | 4/2008 | Hayward et al. |
| 2008/0291461 | A1 | 11/2008 | Waagaard et al. |

(Continued)

FOREIGN PATENT DOCUMENTS

WO    WO 2010/136810 A2    12/2010

OTHER PUBLICATIONS

Scott, S. L., et al., "Worldwide Assessment of Industry Leak Detection Capabilities for Single & Multiphase Pipelines," Offshore Technology Research Center, Texas A&M University, Aug. 6, 2003, 125 pgs.

(Continued)

*Primary Examiner* — Laura Martin
*Assistant Examiner* — Rose M Miller
(74) *Attorney, Agent, or Firm* — David H. Jaffer; Pillsbury Winthrop Shaw Pittman LLP

(57) ABSTRACT

The present invention relates to distributed acoustic sensing using fiber-optic system. More particularly, the present invention describes use of frequency pulse labeling techniques and wavelength pulse labeling techniques for providing high bandwidth acoustic sensing in applications such as infrastructure monitoring. In one embodiment, a segmented sensing fiber is used with corresponding circulators in an architecture that controls the interrogation of each segment of the fiber. In another embodiment, a single continuous length of sensing fiber is used, but a plurality of pulse sequences with different wavelengths are used to interrogate. In both configurations, heterodyne beat frequency components are rejected by a processing scheme, resulting in a simple direct measurement of baseband phase information.

20 Claims, 10 Drawing Sheets

(56) References Cited

U.S. PATENT DOCUMENTS

| | | | |
|---|---|---|---|
| 2009/0169208 | A1 | 7/2009 | Grigoryan et al. |
| 2009/0268765 | A1 | 10/2009 | Mahgerefteh et al. |
| 2010/0073667 | A1 | 3/2010 | Cyr et al. |
| 2010/0303121 | A1 | 12/2010 | Alalusi et al. |
| 2012/0162639 | A1* | 6/2012 | Farhadiroushan et al. .. 356/73.1 |
| 2013/0025375 | A1* | 1/2013 | Goldner et al. ................. 73/655 |

OTHER PUBLICATIONS

Tafuri, A., et al., "Leak Detection and Leak Location in Underground Pipelines," U.S. Environmental Protection Agency and New Jersey Institute of Technology, 1997 International Oil Spill Conference, pp. 379-381.

Dandridge, A., et al., "Multiplexed Interferometric Fiber Sensor Arrays," SPIE vol. 1586 Distributed and Mutiplexed Fiber Optic Sensors (1991), pp. 176-183.

Cranch, G.A., et al., "Efficient Large-Scale Multiplexing of Fiber Bragg Grating and Fiber Fabry-Perot Sensors for Structural Health Monitoring Applications," Proc. of SPIE, vol. 6179, (2006), pp. 1-12.

Nash, P. J. et al., "Large Scale Multiplexed Fibre-optic Arrays for Geophysical Applications," Proc. of SPIE, vol. 4202, (2000), pp. 55-65.

Hill, D., et al., "Fibre-Optic Hydrophone Array for Acoustic Surveillance in the Littoral," Proc. of SPIE, vol. 5780, (2005), pp. 1-10.

Berkoff, T. A., et al., "Eight Element Time-Division Multiplexed Fiber Grating Sensor Array with Integrated-Optic Wavelength Discriminator," Second European Conference on Smart Structures and Materials, 1994, pp. 350-353.

Todd, M.D., et al., "Improved, Operationally-passive Interferometric Demodulation Method Using 3×3 Coupler," Electronic Letters, vol. 38, No. 15, Jul. 18, 2002, pp. 784-786.

International Search Report and Written Opinion Issued Mar. 19, 2012 for PCT/US2011/061548.

* cited by examiner

PULSE LABELING FOR HIGH-BANDWIDTH FIBER-OPTIC DISTRIBUTED ACOUSTIC SENSING WITH REDUCED CROSS-TALK

CROSS-REFERENCE TO RELATED APPLICATIONS

The present application claims priority from U.S. Prov. Appln. No. 61/415,301, filed Nov. 18, 2010, and from U.S. Prov. Appln. No. 61/422,104, filed Dec. 10, 2010, the contents of which are incorporated herein by reference in their entirety.

FIELD OF THE INVENTION

The present invention relates to distributed acoustic sensing using fiber-optic system. More particularly, the present invention describes use of frequency pulse labeling techniques and wavelength pulse labeling techniques for providing high bandwidth acoustic sensing.

BACKGROUND

It is known that high resolution technique for distributed fiber optic acoustic sensing rely on Coherent Rayleigh (CR) effect which is applied for measurements of dynamic strain induced in the sensing fiber by propagating high pressure acoustic waves along an infrastructure, such as, production wells, pipelines, or by generating acoustic high frequency "noise" in a structure that has a leak. To identify the source of acoustic signal, it is necessary to have a signal proportional to the dynamic strain, i.e., a signal having a linear response, and therefore, CR signal must be phase demodulated.

It is also known that the one of the most robust system architectures able to multiplex very large number of sensing elements is time divisional multiplexing (TDM) architecture. Combined with high sensitivity, high resolution and low cross-talk between sensing elements, TDM architecture offers so far a great performance for distributed sensing.

Conventional techniques related to the TDM approach in distributed sensing for low frequency sensing applications, such as, seismic, downwell acoustic, downwell seismic, streamer, etc., typically have acoustic bandwidth below a few kHz. Interrogation of the backscattered pulses is done by using heterodyne demodulation, where an array of sensors is interrogated with two optical pulses that are frequency shifted relative to each other and separated in time by a period set to twice the transit time in the sensor fiber.

However, TDM architecture has one fundamental shortcoming, i.e. bandwidth (BW) of the detection depends on the sensing length. In TDM approach, a transmitter launches a series of short laser pulses into a sensing fiber with repeatable sequences at a pulse repetition rate $PRF_L$. As a result, data is interrogated, i.e. sampled at a sample rate $f_s$ equal to $PRF_L$, and correspondingly, Nyquist frequency, i.e. BW of the detection is equal to half of the $PRF_L$.

To improve the signal to noise ratio (SNR) in interrogating time-multiplexed interferometric sensors some conventional techniques use multiple interrogating pulse pairs and phase modulators as a frequency shifter, such that optical frequencies produced in different transmission time-slots are different. This approach allows an increased duty cycle, acceptable SNR and acoustic bandwidth of the detection, and reduces cross-talk during interrogation. Still, this approach is based on the heterodyne interrogation which limits detection of acoustic frequencies up to 20-30 kHz only.

To increase acoustic bandwidth to higher frequencies, it is necessary to increase the pulse interrogation rate over the length of sensing fiber, and use time sequences with multiple pulses to avoid heterodyne detection of interrogating pulses.

What is needed is a system for distributed sensing which provides simpler measurement techniques for acoustic signal, and which is configured to reject undesired contribution from backscattered signals.

SUMMARY

The present invention uses direct measurements of baseband acoustic phase information, and uses a heterodyne detection to reject undesired contribution of delayed backscattered pulses.

In one aspect of the invention, a fiber-optic system for distributed acoustic sensing is disclosed, the system comprising: a first optical source for launching a probe signal at a first wavelength into a segmented sensing fiber coupled to an infrastructure, wherein the probe signal comprises a sequence of pulses each having an individual frequency label; a plurality of circulators, each circulator preceding a corresponding segment of the segmented sensing fiber; a plurality of up-lead fiber links, each up-lead fiber link coupled to a corresponding circulator of the plurality of circulator; and, a controller module for controlling interrogation of the segmented sensing fiber by detecting and processing backscattered pulses coming from each segment of the segmented sensing fiber; wherein the backscattered pulses from each segment of the segmented sensing fiber are routed by the corresponding circulator via the corresponding up-lead fiber link to the controller module, and, wherein analysis of the frequency label in the backscattered pulses by the controller module and signal processing utilizing time-division-multiplexing (TDM) technique identify a location of acoustic noise source along the infrastructure to which the segmented sensing fiber is coupled.

In another embodiment, a fiber-optic system for distributed acoustic sensing is disclosed, the system comprising: a plurality of optical sources for launching a probe signal into a sensing fiber coupled to an infrastructure, wherein the probe signal comprises a plurality of sequences of pulses, each sequence of pulses having a corresponding wavelength, and within each sequence of pulses, each pulse having an individual frequency label as well as a wavelength label; an optical switch to selectively turn on one of the plurality of optical sources while turning the other optical sources off in a predetermined temporal manner controlled by a delayed pulse generator; a wavelength-division-multiplexing (WDM) coupler that combines an output of the optical switch; a circulator preceding the sensing fiber, where the circulator has a wide bandwidth that includes the wavelengths corresponding to the plurality of sequences of pulses; an up-lead fiber link coupled to the circulator; and, a controller module for controlling interrogation of the sensing fiber by detecting and processing backscattered pulses coming from the sensing fiber; wherein the backscattered pulses from the sensing fiber are routed by the circulator via the up-lead fiber link to the controller module, and, wherein analysis of the frequency label in the backscattered pulses by the controller module and signal processing utilizing time-division-multiplexing (TDM) technique identify a location of acoustic noise source along the infrastructure to which the sensing fiber is coupled.

In both configurations, heterodyne beat frequency components are rejected by a processing scheme, resulting in a simple direct measurement of baseband phase information.

These and other aspects of the present invention will be apparent to persons skilled the art in view of the accompanying drawings and the detailed description of the example embodiments.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF EXAMPLE EMBODIMENTS

Figure 1:
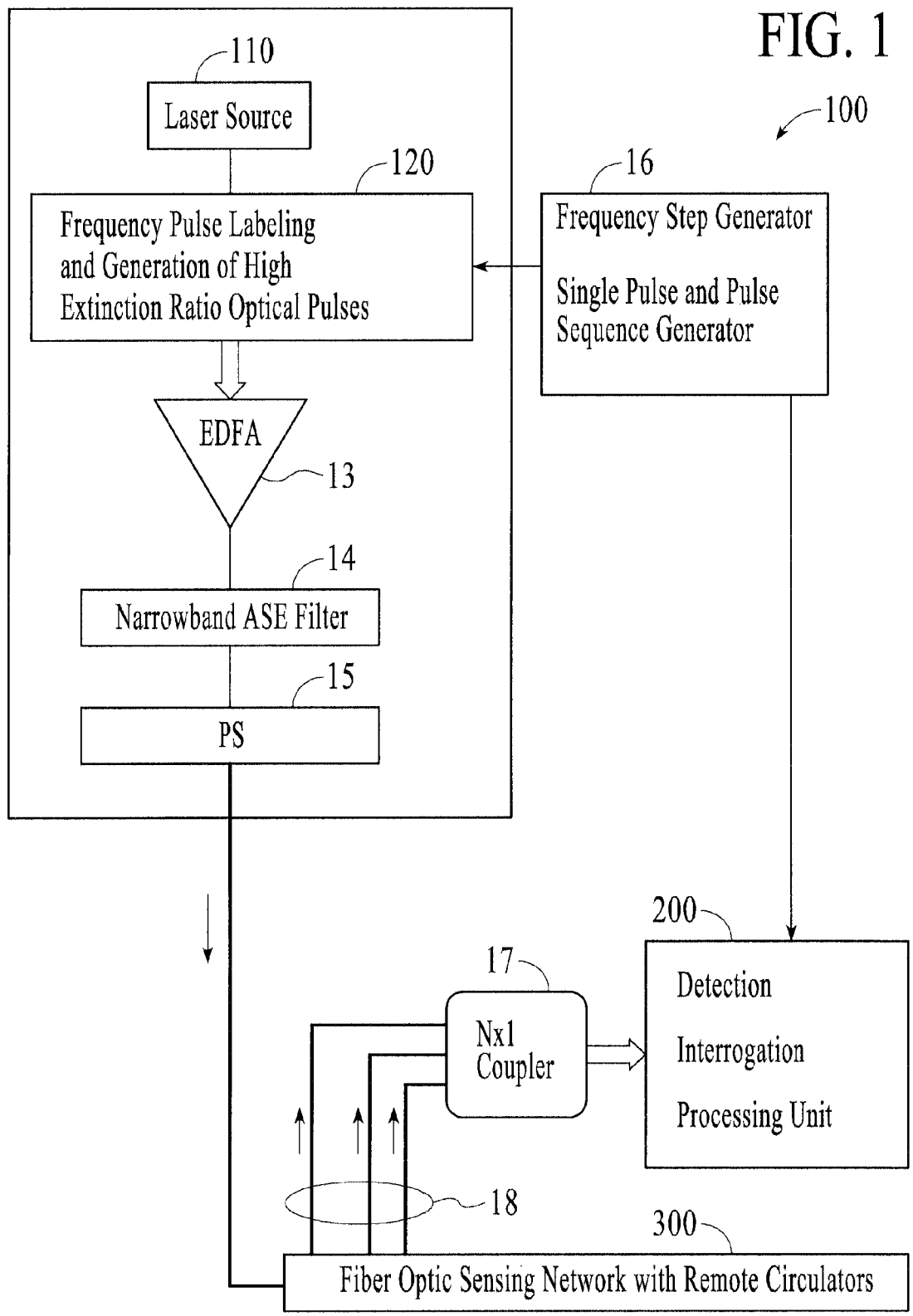
FIG. 1 shows a single laser source TDM based fiber-optic distributed system for high frequency acoustic detection with a frequency pulse labeling sub-system, an interrogation and signal processing unit, and a fiber-optic sensing network with remote circulators, according to an example embodiment of the present invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Embodiments of the present invention describes pulse labeling for high bandwidth fiber optic distributed acoustic sensing (FODAS) systems for detection and identification acoustic signals generated by the leaking pipeline and other infrastructure which may not be functioning as intended, and/or may be structurally compromised. It is known that for detection and identification of leakage in the transmission pipelines (or detecting other similar malfunction) it is necessary to design acoustic sensing system with at least some of following requirements: 1) Long haul acoustic sensing; 2) High bandwidth acoustic detection, i.e. system must be capable to detect high frequency acoustic "noise"; 3) FODAS must have a capability of leakage characterization, i.e. it should be able of linear phase demodulation of high frequency signal; 4) FODAS system must be truly distributed and multiplexed with high spatial resolution.

Long haul sensing may involve distances in the range of 10 to 50 km, but these example values do not limit the invention. Similarly, non-limiting example values of spatial resolution may be 1-10 meters, and non-limiting example values of high-frequency acoustic noise may be in the range of 50-100 kHz.

In addition, some embodiments of FODAS may have capability to detect and identify low frequency (for example, less than few kHz) intrusion events. Preferably, FODAS should work with existing fiber-optic installation.

Though illustrative examples of sensing applications, such as pipeline monitoring is mentioned in the specification, persons skilled in the art will appreciate that the systems and methods of the present invention are not limited by the intended application, and can be modified based on the requirements and end goals of the application, as needed.

One object of the invention is to provide a TDM based fiber-optic distributed sensing system with high signal bandwidth (BW) for high frequency acoustic detection. FIG. 1 shows such an example system. The invention relies on pulsed coherent Rayleigh backscatter sensing with a compensating interferometric interrogation system that uses a single source such as a low frequency noise and narrow linewidth external cavity laser at $\lambda=1.55$ μm. Such a source, commercially known as ORION, is developed and manufactured by Redfern Integrated Optics, Inc of Santa Clara, Calif., USA. The system of the invention uses pulse labeling, such that a series of pulses is launched sequentially with a unique frequency label at the corresponding frequency $v_0+f_k$, where $v_0$ is an optical carrier frequency and $f_k$ is a frequency shift superimposed on the pulse by a frequency modulated (FM) pulse generator. Such FM pulse generator labels or tags each incoming pulse of the optical sequence. This pulse labeling framework allows the sensing fiber network to launch multiple pulses separated by a time interval which is much shorter than the round trip time (RTT) of the pulse to the end of the fiber and back to the detector.

Embodiments of the invention also provide a sensing fiber network for sensing high frequency acoustic waves generated by the pressurized leaking of a pipeline. By propagating acoustic waves induced by the high frequency localized dynamic strain in the sensing fiber network to locate the close proximity to the leak in the pipeline.

Figure 2:
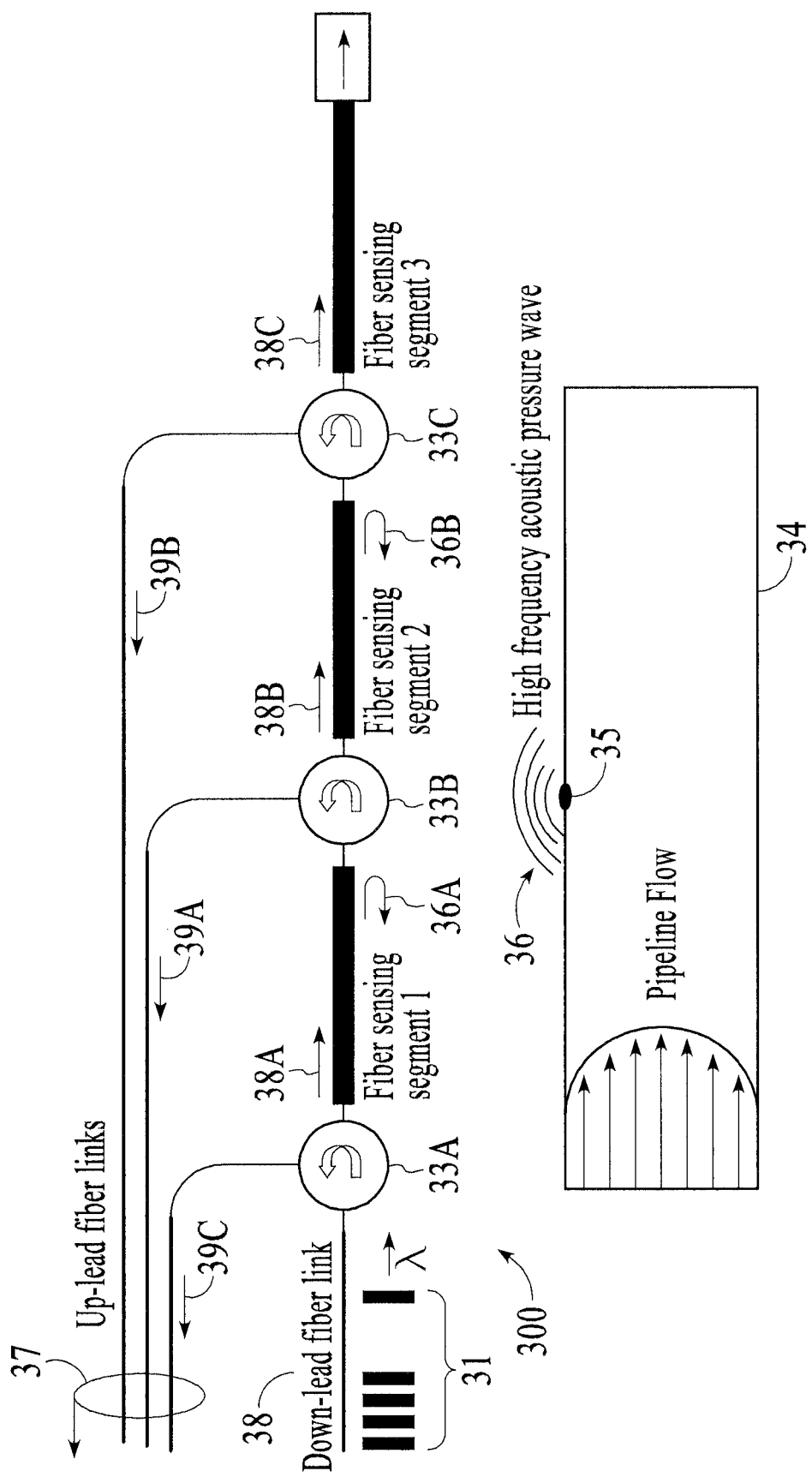
FIG. 2 shows the details of an example architecture of fiber-optic sensing network with remote circulators, according to an embodiment of the present invention.

FIG. 2 shows an example fiber-optic network, according to an embodiment of the present invention. The network consists of fiber optic sensing segments (sensors) separated by the remote optical circulator with a high degree of optical isolation. As a result, each segment of the fiber sensing segment is isolated from the backscattering events from another sensing segment.

Such sensing architecture allows considerably reduced cross-talk between the sensing segment and optimized pulse labeling sequence for only the length of the single sensing segment. Such a sensing network may be used in new/existing installations for distributed acoustic sensing.

Yet another object of the invention is to maximize the pulse peak power launched into sensing fibers, and correspondingly, maximize the SNR by using a sensing fiber with negative dispersion. An example of such a fiber would be standard telecommunication fibers such as MetroCor and LEAF fibers produced by Corning, Inc. The launch peak power may be limited by non-linear effects depending on fiber length and pulse width. For a pulse width <50 nsec the available peak power is limited to so-called modulation instabilities. Modulation instability generates side-lobes around the pulse spectrum in the frequency domain and broadens the Coherent Rayleigh spectrum. If the operating wavelength is in the region of negative dispersion of the sensing fiber, then the effect of modulation instability could be minimized and the peak launch power can increase by a few times (for example, up to 500 mW with the pulse length 50 nsec and the fiber sensing length ~15 km).

Another object of the invention is to provide a detection and interrogation processor (such as a processor shown in FIG. 3) which produces a linear response to the dynamic strain in the sensing fiber induced by a high frequency acoustic wave. Such a processor operates by detecting and interrogating multiple backscattered pulses routed back from the sensing segments and separated by the time interval which is much shorter than the round trip time where RTT of pulses propagate down the fiber sensing segment and then back. The processor of the invention uses a compensating Michelson Interferometer with 3×3 optical coupler. Such a detection scheme allows for homodyne phase demodulation of backscattered pulses interfering at the output of the compensated interferometer without limitation on the down conversion carrier frequency such as in phase generated carrier (PGC) interrogation scheme.

The three outputs of compensated Michelson interferometer provide baseband information on the phase of interfering pulses backscattered and recombined at the output of the compensated interferometer. Pulse labeling makes possible the operation with high interrogation sample rate corresponding to the detection of high frequency acoustic waves (~100 kHz) and at the same time allows for identifying and rejecting scattering contribution pulses from "wrong sites" within the sensing fiber segment.

Figure 4:
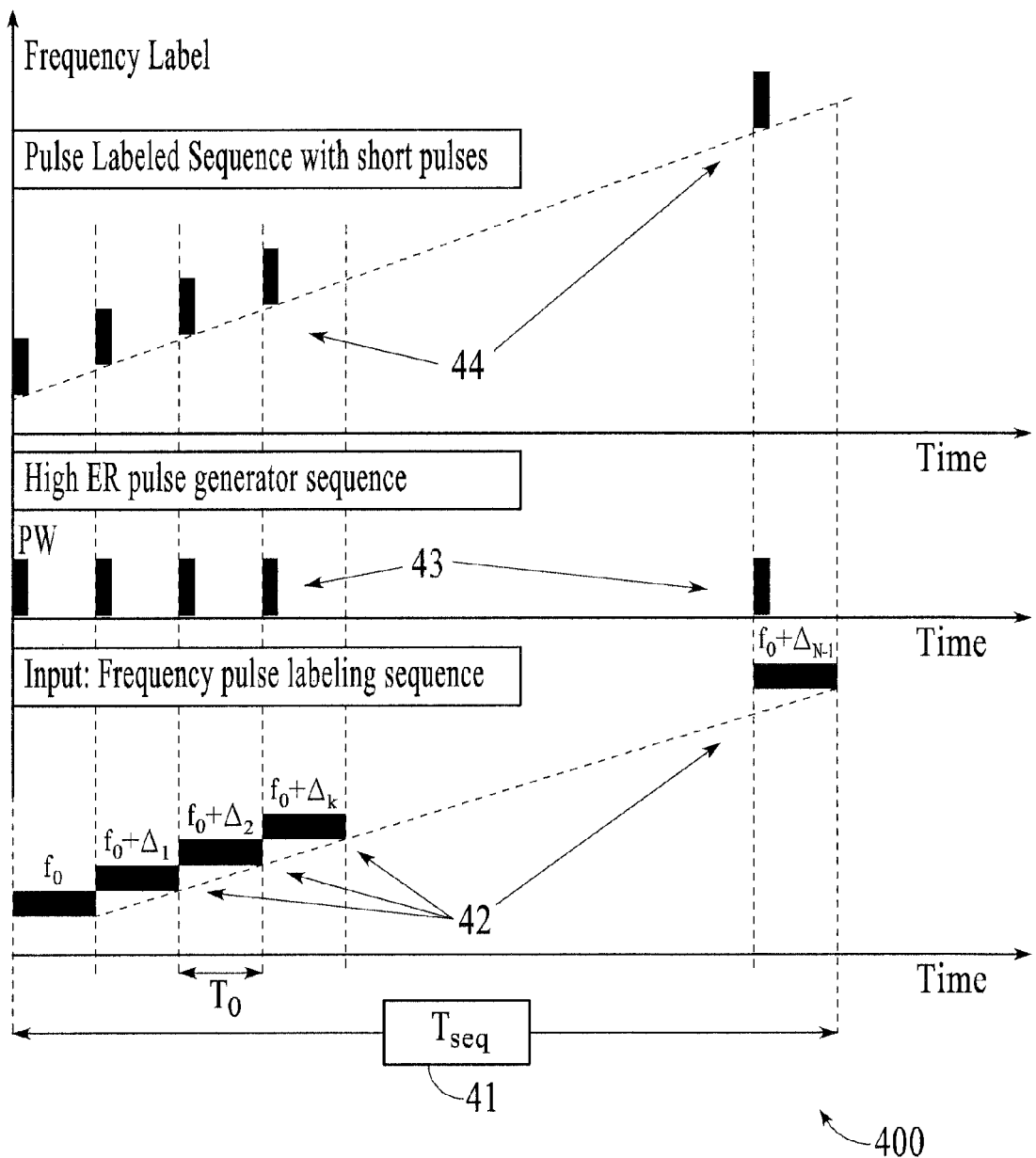
FIG. 4 shows the details of the timing diagram for generation of frequency labels assigned to the high extinction ratio pulses in multi-pulse time sequences, according to an embodiment of the present invention.

Another object of the invention is to provide a timing diagram for pulse labeled sequence, an example of which is shown in FIG. 4. This such timing diagram is used by a FM pulse labeling source in combination with optical pulse generation. Frequency pulse labeling is optimized for the particular length of the sensing fiber segment $L_{segment}$ and designed to generate a sequence of multiple frequency labeled pulses with time duration $T_{seq}$ where the time duration of such sequence is equal to the round trip time, RTT in sensing segment $T_{seq}=RTT=2\ L_{segment}/V$, where V—is speed of light in fiber. Pulses in such a sequence are separated in time $T_0$ equal to the sample time necessary to detect the acoustic signal with the bandwidth BW, i.e. $\Delta T=\frac{1}{2}$ BW. The operation of any FM pulse labeling generator in combination with an optical pulse generator (for example, acousto-optical modulator (AOM) and semiconductor optical amplifier (SOA) must follow such a timing diagram.

Figure 5:
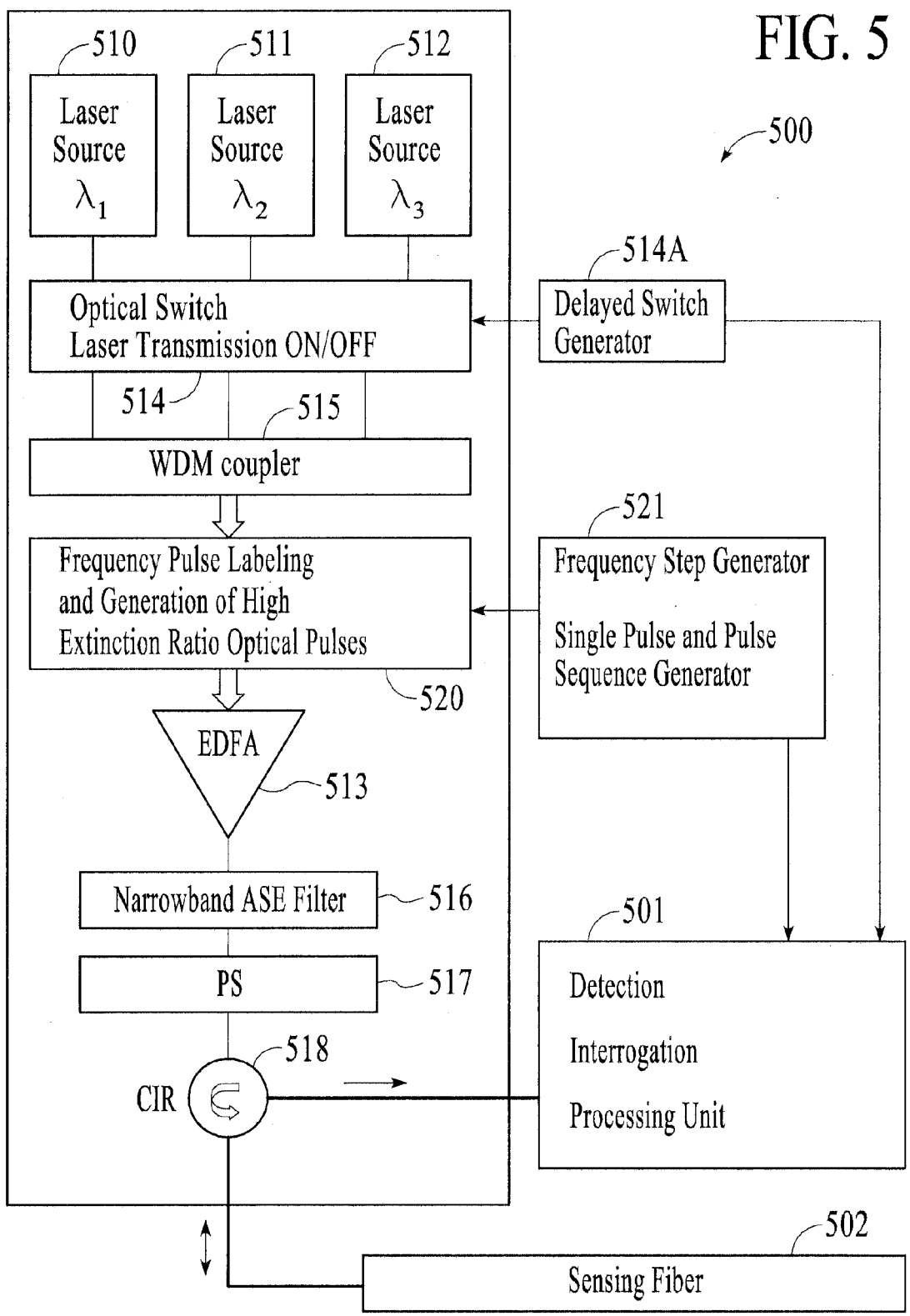
FIG. 5 shows a TDM based fiber optic distributed system for high frequency acoustic detection with multiple laser sources configured for dual labeling, an interrogation and signal processing unit, and long single lead acoustic sensing fiber, according to an embodiment of the present invention.
Figure 6:
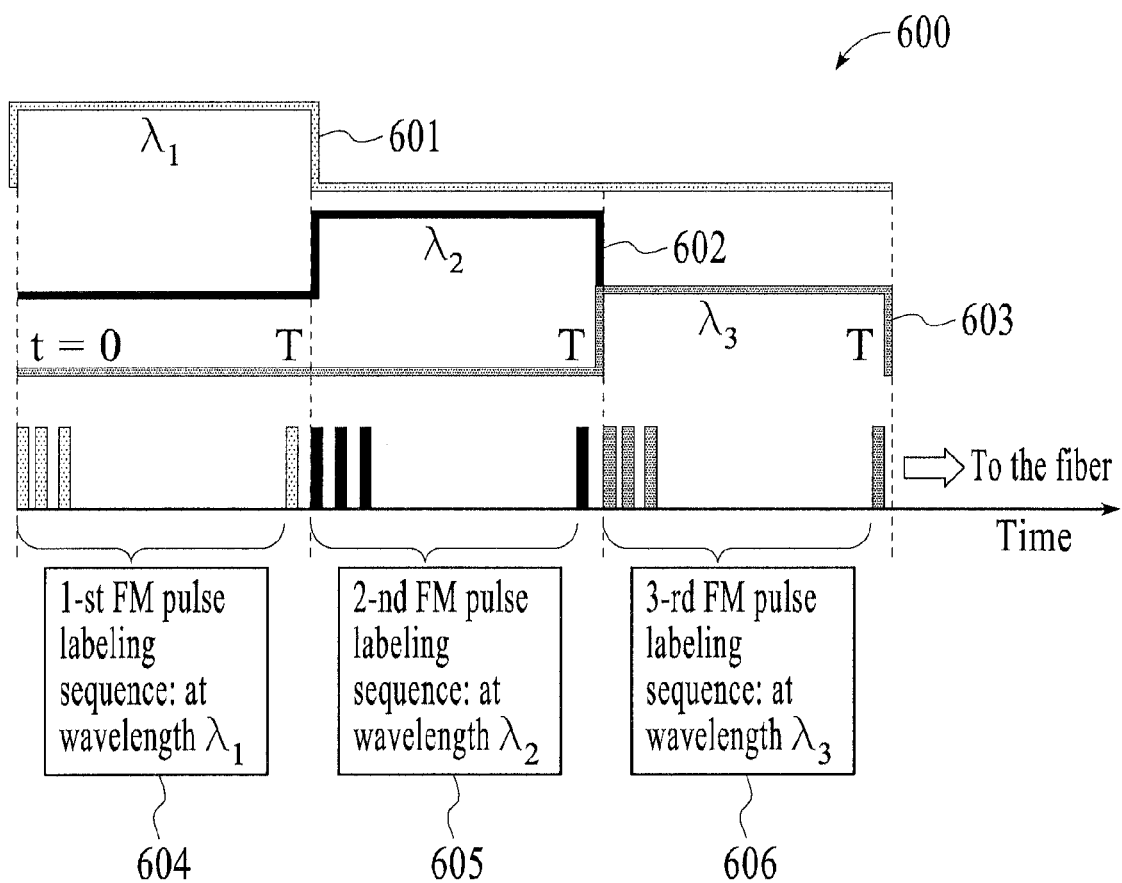
FIG. 6 shows the details of the timing diagram for generation of dual labels assigned to pulses in multi-pulses time sequences, according to an embodiment of the present invention.

A further object of the invention is to provide TDM based fiber-optic distributed sensing system (examples of which are shown in FIGS. 5, 6) with high signal bandwidth (BW) for high frequency acoustic detection. The system of the invention uses multiple wavelength laser sources. The transmission of each laser source is governed by an optical switch which remains in the ON position for each laser/wavelength only during the finite time equal to the round trip time of the sensing segment of the fiber. All such laser sources are combined in one optical output using a wavelength division multiplexing (WDM) coupler. Such transmitter architecture generates continuous long sequences of pulse with a very high repetition rate equal to 2 BW (where BW is the maximum bandwidth of an acoustic wave signal) where the long sequence consists of a series of short sequences with the assigned wavelength and time duration equal to the round trip time of each sensing segment. Example value of bandwidth may be ~100 kHz, but the invention is not limited by any particular bandwidth value.

Pulses in each sequence propagating down the fiber has different wavelengths and therefore there is no interference between the backscattering pulses originated from different fiber segments and as a result cross-talk between the sensing segments is considerably reduced.

Such a system architecture is intended for use in existing installations and long haul distributed acoustic sensing over a few sensing segments. For example, each segment length could be 5 km and overall length L=15 km, but persons skilled in the art will understand that these example values are non-limiting to the scope of the invention.

Various elements of the accompanying figures are now described in more detail.

FIG. 1 illustrates a fiber optic time-division multiplexing TDM distributed sensing system 100 for high bandwidth acoustic sensing with fiber network with remote circulators that incorporates the principles of the present invention. The system 100 includes an external cavity low frequency noise laser source 110 (such as ORION) coupled to a module 120 that outputs a high extinction ratio (ER) optical pulse sequences from the laser source 110. Module 120 also provides pulse labeling. Module 120 may be coupled to another electronic module 16 that generates frequency step and single pulse/sequence of pulses that helps in the optical pulse output. An Erbium-Doped Fiber amplifier (EDFA) 13 produces high peak power amplification of the incoming pulse sequences. The pulse sequence then goes through a narrowband amplified-spontaneous emission (ASE) filter 14 and polarization scrambler (PS) 15. The polarization scrambler (PS) reduces polarization drift in TDM based distributed sensing with compensated interferometers. The resulting pulse sequence is launched into the fiber-optic sensing network 300. The network 300 has remote circulators. The pulse sequence launched into the fiber-optic network is backscattered and routed via output fiber up-leads links 18 to the output fiber-optic coupler 17 (an N×1 coupler, where N is an integer) and to the detection, interrogator and processing unit 200.

Depending on the resolution requirements in the sensing system, i.e. length of the acoustic aperture ΔL, there are different ways to generate frequency pulse labeling sequences with a high extinction ratio (ER).

Figure 7:
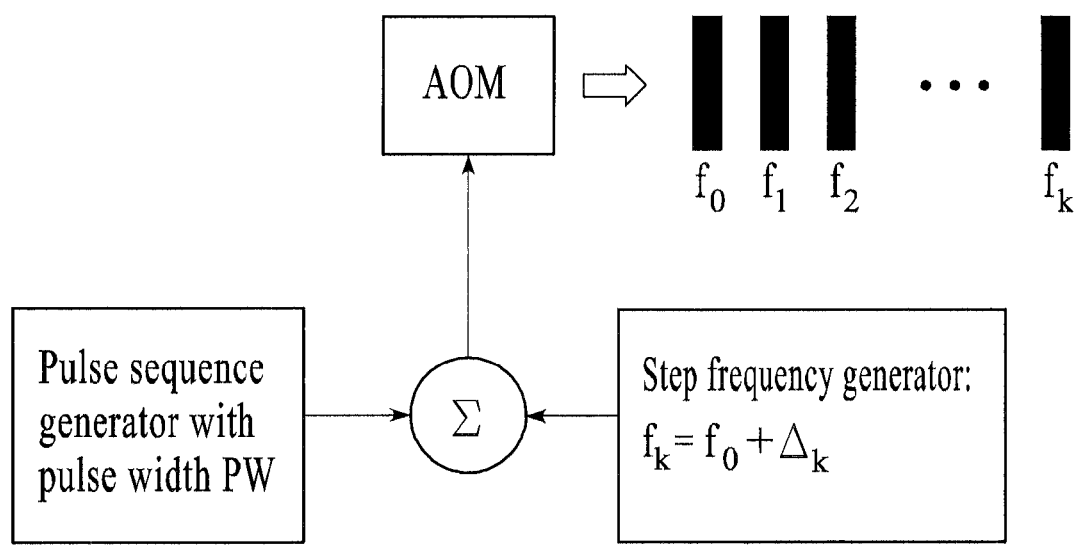
FIGS. 7 and 8 show details of two alternatives means to generate frequency labeled high extinction ratio pulses in multi-pulse time sequence, according to two example embodiments of the present invention.

For example, in a situation where a delay $\tau_0$ corresponding to the acoustic aperture ΔL is much larger than the rise time RT of the individual pulse, i.e., $\tau_0 \gg RT$, pulse sequences can be generated by frequency tuning of acousto-optical modulator (AOM) which can produce sequence of short pulses with frequency shifted carriers. FIG. 7 shows such a scheme. Typically, AOM has a rise time of the order of 30-50 nsec.

Figure 8:
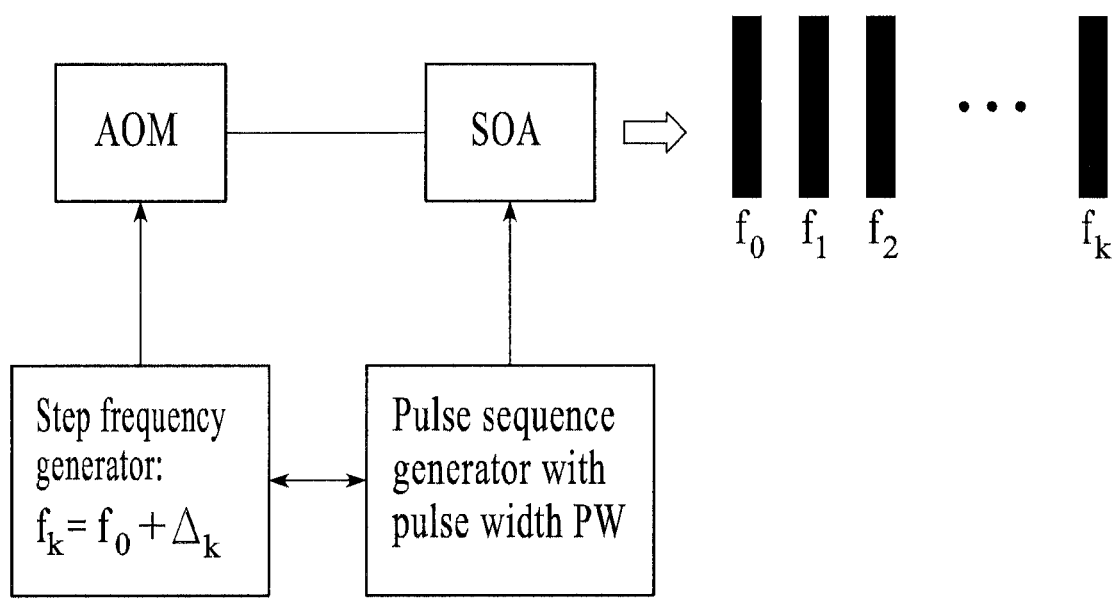

If the system resolution requires short pulses with pulse width (PW) of the order 10-20 nsec, then the frequency pulse labeling sequences is generated by combinations of AOM and semiconductor optical amplifier (SOA), as shown in FIG. 8. The scheme of FIG. 8 produces short pulse with rise time of the order of a few nanoseconds and a very high extinction ratio, ER>50-55 dB.

The timing diagram for both implementations is described in FIG. 4. Such timing diagram describes the generation of frequency pulse labeled sequences for high frequency acoustic sensing in the sensing fiber with length L.

An illustrative example of the design parameters for a sensing fiber length of 5 km and acoustic BW of 100 kHz is described herein. According to the Nyquist rule, the interrogation or data rate of 200 kHz, or sample time, ST=5 μsec. Round-trip time (RTT) in the sensing fiber with a length of 5 km corresponds to 50 μsec.

Accordingly, to maintain a data rate of 200 kHz in such fiber length, a sequence with 10 pulses with a time interval between them $T_0=5$ μsec is required. Time interval is equal to the sample rate ST=5 μsec.

In the FIG. 4, $T_{seq}$ corresponds to the length of the pulse sequence (which is 50 μsec for 10 pulses) and $T_0$ corresponds to the time interval between the pulses. Here, $T_0=5$ μsec. According to FIG. 4, frequency pulse labeling is done by an AOM frequency shifter (for both implementations, FIG. 7, 8). Each new frequency is labeled $f_k=f_0+\Delta_k$ where $f_0$ is an AOM carrier frequency and, $\Delta_k$ is frequency tuning step in the initial "long sequence" and is established during an interval of 5 μsec, for example. Such a long frequency labeled sequence is launched into a SOA where initial long pulses are truncated into final pulse with PW of SOA (FIG. 8), or alternatively, both sequences could be generated with just an AOM (FIG. 7). The result of such operation is a frequency labeled pulse sequence which launches into the sensing fiber with corresponding design length (in our example, the design length of the sensing segment is 5 km).

Figure 9A:
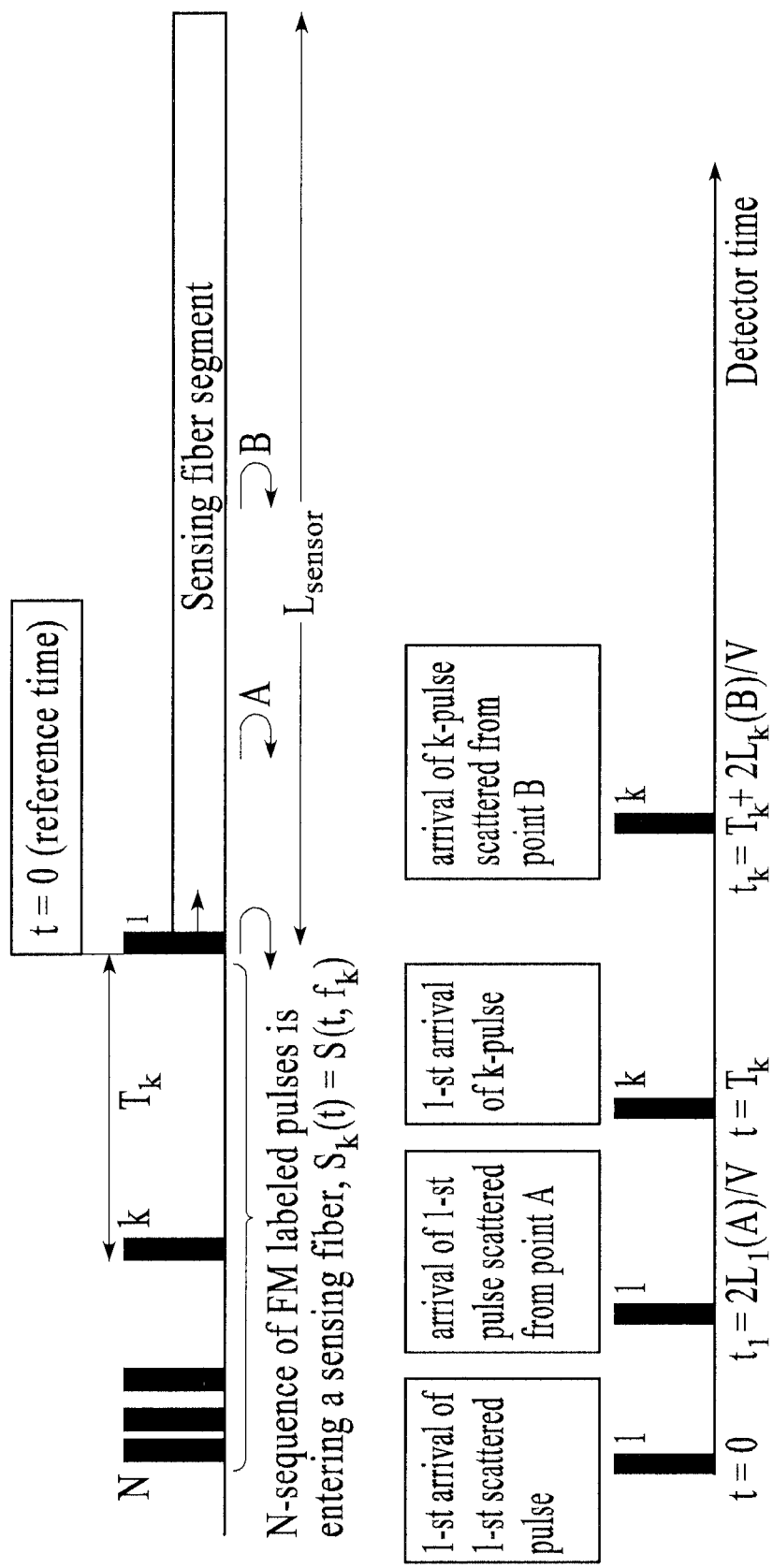
FIGS. 9A-B shows details of a generation of error signals in TDM system represented by heterodyne beat frequencies and contribution from different delayed optical pulses propagating down the sensing fiber and scattered back to the interrogation unit, according to an example embodiment of the present invention.
Figure 9B:
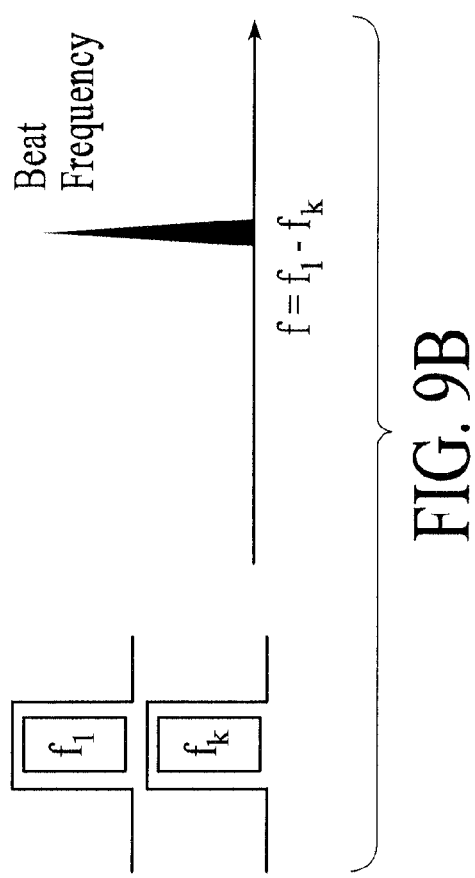

Next, with reference to the FIGS. 9A-9B, it is described how to discriminate backscattering of different pulses with a relative delay between them from backscattering from the same pulse propagating down the sensing fiber and scattering from different sensing sites A and B.

If the conditions $t_k - t_1 = 2\tau_0$ are satisfied, i.e. $L_1(A) - L_k(B) = (T_k/2 - \tau_0)V$, where V is the speed of light in sensing fiber, then both first pulse with frequency label $f_1$ and k-th pulse with frequency label $f_k$ will arrive to the compensated interferometer input with time delay $2\tau_0$ and interfere at its output, and as a result generate heterodyne beat with frequency $f_{1k}=f_k-f_1$ (shown in FIG. 9B). Interference with heterodyne beat frequency allows identification of backscattering from different pulses and makes it easier to reject them.

If the maximum fiber sensing length is 5 km and there are 10 pulses with time interval between them being 5 μsec, then the minimum distance between the interfered pulses is 500 m and corresponding heterodyne beat frequency is $\Delta f_{min} = f_{k+1} - f_k$ while the maximum distance between the interfered pulses is 5 km, and corresponding maximum beat frequency is $\Delta f_{max} = f_{k+1} - f_k$. Therefore during the sequence interrogation with 10 pulses and 5 km sensing fiber where the data rate of 200 kHz there will be 10 discreet heterodyne beat frequencies: $\Delta f_{min} < f < \Delta f_{max}$.

FIG. 2 shows components of fiber-optic sensing network 300. A multiple pulse labeled sequence 31 at wavelength λ is launched into a fiber-optic network 300 via a down lead fiber link 38 with remote circulators. Such network comprises multiple sensing segments (sensors) 38A, 38B, 38C, each having distance of 5 km (in this example) and is separated by optical circulators 33A, 33B, 33C with high isolation. The fiber-optic network is structurally coupled to a pipeline 34 in which a fluid flow is established. The pipeline may have a leak at location 35 where high-frequency acoustic pressure wave 36 is generated. Persons skilled in the art will appreciate that even though three fiber segments are being discussed in this illustrative example, any number of segments can be accommodated. Multiple pulses propagate down the sensing fiber, but the backscattering pulses cannot propagate back through the circulators. As a result the circulator in front of a particular sensing segment routes all backscattered pulses 39A, 39B, and 39C back via the up-lead optical leads 37, where there is one up-lead for each circulator. Such an architecture effectively allows for interrogation of only one sensing segment with the sensing length matched to the length of the propagating pulse sequence where each has an individual frequency label, but has the same wavelength characteristics.

Output leads 37 are combined into one optical output where there is a 3×1 output coupler, such as the N×1 coupler 17 in FIG. 1, i.e., here N=3. The output of the output coupler is routed to the detection, interrogation and processing unit 200, which is also referred to as the controller module in the subsequent description and the claims.

Figure 3:
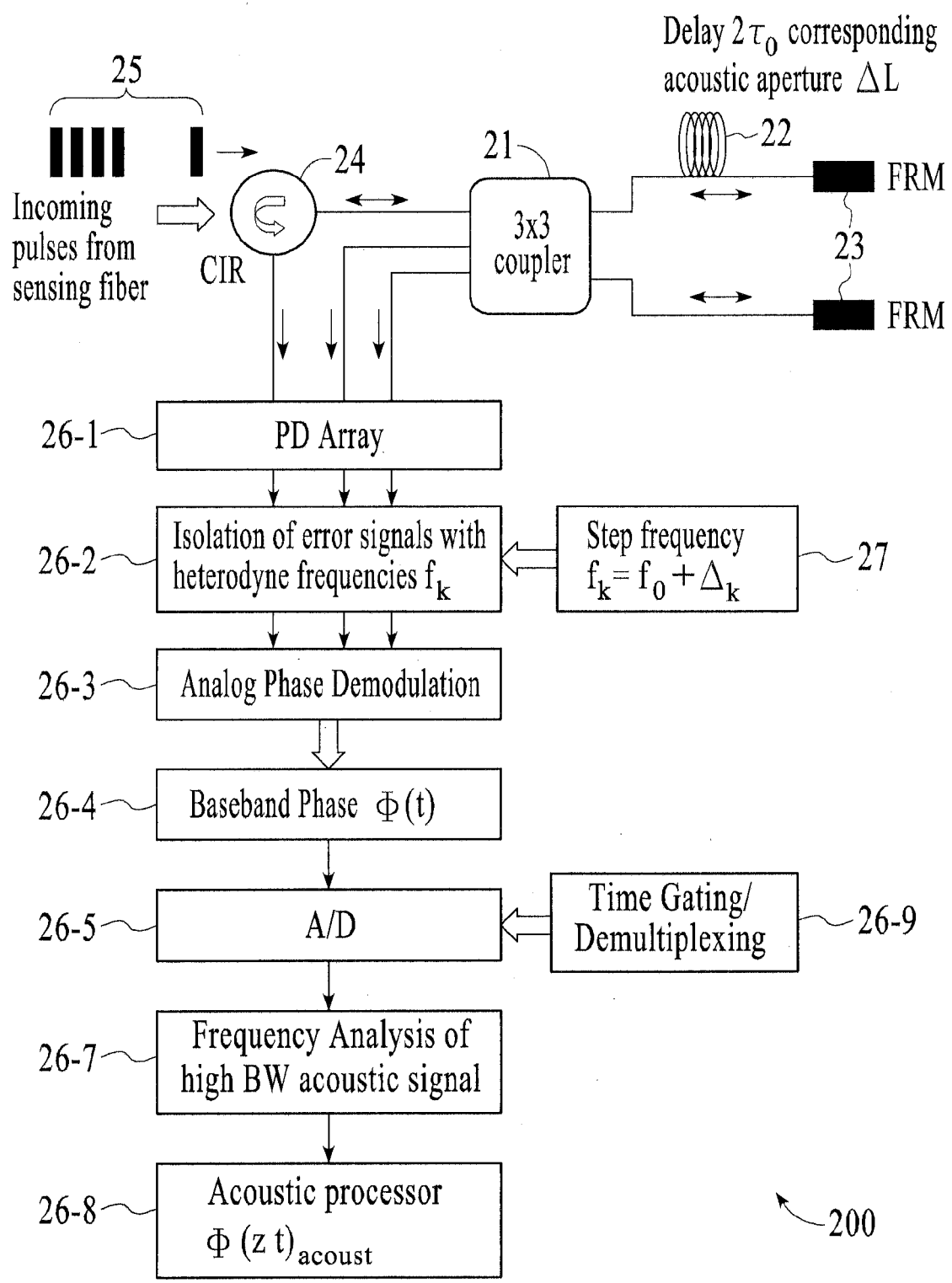
FIG. 3 shows the details of interrogation and signal processing unit based on a low loss compensating Michelson Interferometer with a 3×3 coupler and components for heterodyne frequency rejection and homodyne phase demodulation, according to an embodiment of the present invention.

FIG. 3 describes the operation of the controller module 200, according to an embodiment. Module 200 comprises a compensating Michelson Interferometer 22 (time delay $2\tau_0$, with $\tau_0=\Delta L/V$, acoustic aperture ΔL) with 3×3 optical coupler 21 and photodiode array and analog phase demodulation. To avoid polarization fading during interrogations of the backscattered pulses the Michelson Interferometer uses Faraday rotated mirrors (FRM) 23.

This such detection scheme allows for the homodyne phase demodulation of backscattered pulses interfered at the output of the compensated interferometer without limitation on the down conversion carrier frequency. Two outputs of 3×3 coupler 21 directly coupled to photodetector (PD) array shown in block 26-1 while the third output is routed to the PD array via optical circulator 24. By using optical circulator 24 in combination with the Michelson interferometer it is possible to minimize the optical losses in one output and equalize the optical power distribution between the coupler's outputs. The three outputs of compensating the Michelson interferometer provide a baseband phase information of the interfered pulses recombined at the output of the compensating interferometer.

The first detection pulse sequence is generated from the scattering fiber sites A and B separated by the distance corresponding to the acoustic aperture ΔL and is originated from the same pulse and the same wavelength (the same λ and the same frequency label) propagating down the sensing fiber. Such pulses arrived to the input of the compensated Michelson interferometer with relative delay $2\tau_0$ Electrical field corresponding cumulative contributions of such multiple pulses scattered from different sensing locations is described by the following expression $$E_{in}(t) \sim E_1(t) + \Sigma_{k1} E_k(t-2\tau_0) e^{j\phi_k} + e^{j(\omega_p-\omega_q)t} E_n(t-2\tau_0) e^{j\phi_n} \quad (1)$$

where index n corresponds to n-pulse having different frequency label, $\omega_q \neq \omega_p$, $\phi_k$ is a phase information corresponding k-th acoustic aperture, $E_n$ and $\phi_n$ are the amplitude and phase of the delayed n-pulse contributing to the cross-talk signal and generating heterodyning beat frequency response at $\Delta\omega = \omega_q - \omega_p$.

After routing through the Michelson interferometer with compensating delay $2\tau_0$ and through the 3×3 coupler's outputs with relative phase delay, we get, $$\beta_s = (s-1) 2\pi/3, \text{ where } s=1,2,3 \quad (2)$$

Voltage output Vs from each photodetector has the following form:

$$Vs \sim V_{peak}\{1 + K \cos(\Phi_{baseband} + \beta_s) + E_n \cos(\Delta\omega t + \phi_n + \beta_s) + E_n \cos(\Delta\omega t + \phi_n - \Phi_{baseband})\} \quad (3)$$

The last two terms in (3) represent high frequency heterodyne terms and $\Phi_{baseband}$ is a baseband phase information (as shown in step 26-4).

Using the mathematical identities $\Sigma_s \cos^2(X+\beta_s)=3/2$ and $\Sigma_s \cos(X+\beta_s)=0$, such heterodyne terms could be isolated and removed by analog means, shown in step 26-2. A step frequency 27 is provided for this step. As a the result of such analog processing one can extract baseband phase information $\Phi_{baseband}$ using analog demodulation approach shown in step 26-3. Since there are no down-conversion requirements in such demodulation process, the signal bandwidth is equal to half the sample rate of the three detectors.

Resulting baseband phase signal is processed by standard time division multiplexing (TDM) approach. Phase is digitized in step 26-5, gated and demultiplexed (as shown in block 26-9), and, finally, frequency analysis of each time gate in step 26-7 allows to obtain and to analyze acoustic information using acoustic processor, as shown in step 26-8.

In yet another example illustrated below, a 100 kHz distributed acoustic sensing system's specifications are discussed. The system has fiber-optic network with remote circulators, as shown in FIG. 1.

Laser source: wavelength $\lambda$=1.55 µm
Sensing fiber type: negative dispersion single mode fiber (example: LEAF fiber)
Sensing segment (sensor) length: 5 km
Sensor array length, i.e. total fiber length: 15 km
Data interrogation rate: 200 kHz
Acoustic BW 100 kHz
Acoustic aperture or sensor resolution $\Delta L$=10 m
Number of interrogation sensors: 1500
Pulse width (PW)=20 nsec
Time sequence 50 µsec
Number of pulses N=10
Pulse time separation $T_0$=5 µsec
Acousto-optic modulator (AOM) carrier frequency $f_0$=200 MHz
Frequency labels: $f_k = f_0 + \Delta_k$, k=1 to 9
Step for frequency label: $\Delta_k$=2.5 MHz Persons skilled in the art will appreciate that the above example values are not limiting to the scope of the first embodiment of the invention shown in FIG. 1.

A second embodiment of the invention is shown in FIG. 5, where instead of a segmented sensing fiber, a continuous length of sensing fiber is used, but both frequency labeling and wavelength labeling is used for labeling sequences of pulses, as elaborated below.

FIG. 5 describes a distributed acoustic sensing system 500 with single sensing fiber 502 having a sensing length much larger than the corresponding length of the pulse sequence design for 5 km sensing segment, as discussed in FIG. 1. To maintain high interrogation rate over round trip time (RTT) of whole fiber of length (i.e., $L >> L_{segment}$) it is necessary to have a long pulse sequence consistent with many characteristics similar to the characteristics of the pulse sequence discussed before. For example, if a pulse sequence is designed for the sensing segment of 5 km (as previously described) and the fiber length is 15 km, then it is necessary that the three such pulse sequences are requires to maintain a high interrogation rate of 200 kHz.

With such long pulse sequence, frequency labeled pulses will repeat itself and there may be an undesirable interference between pulses with the same frequency label but belonging to different pulse sequences.

Therefore, the system 500 is configured to allow easy discrimination between the scattering contribution of the pulse with same frequency label but belonging to different sequences. This system produces additional labels which tag each pulse sequence by assigning a different wavelength. As a result, each pulse now has a frequency and wavelength labels, i.e. $(f_k, \lambda_n)$.

To assign the wavelength labels to pulse sequences, the system of the invention uses three optical sources 510, 511, 512 at three different wavelengths $\lambda_1, \lambda_2, \lambda_3$ (persons skilled in the art will appreciate that any number of optical sources can be used, and three is an illustrative example). An optical switch 514 selectively turn the optical sources ON/OFF with help of delayed pulse generator 514A. Transmission time T (601, 602 and 603) from each source is equal to the length of the individual pulse sequences 604, 605, 606, as shown in FIG. 6.

Output of optical switch, comprising outputs from the three sources, is combined into one output using a wavelength division multiplexed (WDM) coupler 515.

From this point, system 500 operates the same way as previously described system of FIG. 1.

System 500 generates at the transmitter output long pulse sequence comprising a repeated pulse sequences at different wavelengths while pulses within each sequence have different frequency labels.

Figure 10:
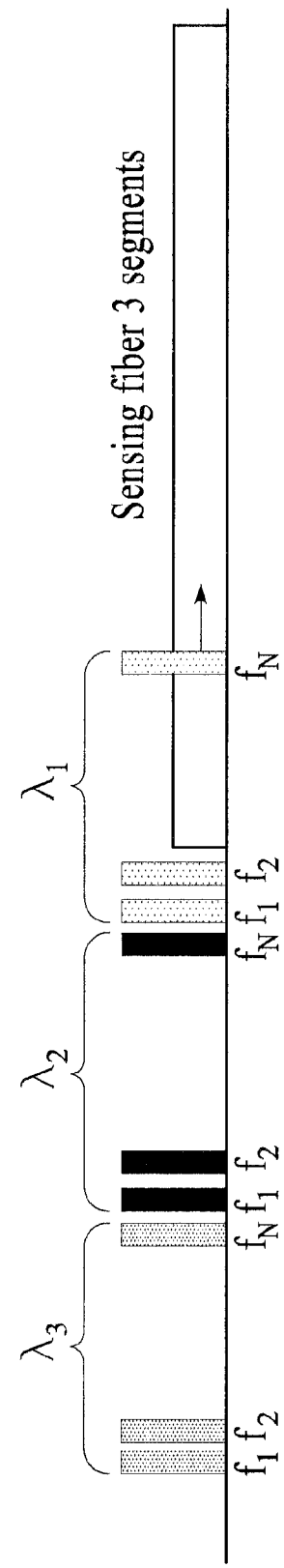
FIG. 10 shows details of propagation down the single optical fiber long time sequence of pulses comprising wavelength labeled short time sequences, each of consistent of frequency labeled pulses

Such long pulse sequence with frequency and wavelength labels is launched into a long sensing fiber (shown in FIG. 10) and is propagated down the fiber 502 and scattered back from fiber scattering sites. All such backscattered pulses are routed back via wideband optical circulator 518 (shown in FIG. 5) and back to the controller module 501 which does detection, interrogation and processing.

Such detection, interrogation and processing unit 501 operates at the same way as previously described unit 200 (FIG. 1). As a result the interferences from difference pulses within the same wavelength sequence produces a heterodyne beat frequency $\sim\exp(j(f_k-f_n)t)$ and can identify and reject heterodyne components the same way as described in operation of unit 200 in FIG. 3. The interference from pulses with different sequences, i.e. different wavelengths even with the same FM label produces a very high frequency beat signal at the output of compensating interferometer $\sim\exp(j(\omega_k-\omega_n)t)$ which is automatically rejected by the photodetectors themselves.

The descriptions above are intended to be illustrative, not limiting. Thus, it will be apparent to one skilled in the art that modifications may be made to the invention as described without departing from the scope of the claims set out below.

What is claimed is:

1. A fiber-optic system for distributed acoustic sensing, the system comprising:
   a first optical source for launching a probe signal at a first wavelength into a segmented sensing fiber, wherein the probe signal comprises a sequence of pulses;
   a plurality of circulators, each circulator preceding a corresponding segment of the segmented sensing fiber;
   a plurality of up-lead fiber links, each up-lead fiber link coupled to a corresponding circulator of the plurality of circulators; and
   a controller module for controlling interrogation of the segmented sensing fiber by detecting and processing backscattered pulses coming from each segment of the segmented sensing fiber;
   wherein the backscattered pulses from each segment of the segmented sensing fiber are routed by the corresponding circulator via the corresponding up-lead fiber link to the controller module, and
   wherein analysis of the pulses by the controller module and signal processing utilizing time-division-multiplexing (TDM) technique identify a location of acoustic noise source along the segmented sensing fiber.

2. The system of claim 1, wherein the first optical source comprises a low noise narrow linewidth semiconductor-based external cavity laser (ECL) with planar Bragg grating (PBG).

3. The system of claim 1, wherein the sequence of pulses has a high extinction ratio (ER).

4. The system of claim 3, wherein the sequence of pulses with the high ER is generated using an acousto-optic modulator (AOM), or a combination of an AOM and a semiconductor optical amplifier (SOA).

5. The system of claim 1, wherein an acoustic aperture length within each segment of the segmented sensing fiber is related to a delay set in an interferometer included in a detection section of the controller module to enable homodyne phase demodulation of the backscattered pulses to extract baseband phase information.

6. The system of claim 5, wherein the interferometer comprises a compensated Michaelson interferometer.

7. The system of claim 5, wherein high-frequency heterodyne terms obtained during the processing of backscattered pulses are isolated and removed by analog processing means.

8. The system of claim 1, wherein the first optical source is coupled to a Erbium-doped-fiber-amplifier (EDFA) that amplifies an intensity of the probe signal.

9. The system of claim 1, wherein the probe signal passes through a polarization scrambler (PS) before being launched into the segmented sensing fiber.

10. The system of claim 1, wherein a desired acoustic bandwidth and a length of the segmented sensing fiber determine total length of the sequence of pulses, a time interval between individual pulses, and a rate of interrogation.

11. The system of claim 1, wherein each of said sequence of pulses has an individual frequency label.

12. A fiber-optic system for distributed acoustic sensing, the system comprising:
   a plurality of optical sources for launching a probe signal into a sensing fiber, wherein the probe signal comprises a plurality of sequences of pulses, each sequence of pulses having a corresponding wavelength, and within each sequence of pulses, each pulse having an individual frequency label as well as a wavelength label;
   an optical switch to selectively turn on one of the plurality of optical sources while turning the other optical sources off in a predetermined temporal manner controlled by a delayed pulse generator;
   a wavelength-division-multiplexing (WDM) coupler that combines an output of the optical switch;
   a circulator preceding the sensing fiber, where the circulator has a wide bandwidth that includes the wavelengths corresponding to the plurality of sequences of pulses;
   an up-lead fiber link coupled to the circulator; and
   a controller module for controlling interrogation of the sensing fiber by detecting and processing backscattered pulses coming from the sensing fiber;
   wherein the backscattered pulses from the sensing fiber are routed by the circulator via the up-lead fiber link to the controller module, and
   wherein analysis of the frequency label and wavelength label in the backscattered pulses by the controller module and signal processing utilizing time-division-multiplexing (TDM) technique identify a location of acoustic noise source along the sensing fiber.

13. The system of claim 12, wherein the optical sources comprise low noise narrow linewidth semiconductor-based external cavity lasers (ECL) with planar Bragg gratings (PBG), each of the optical source having a different wavelength.

14. The system of claim 12, wherein each of the sequences of pulses has a high extinction ratio (ER).

15. The system of claim 14, wherein the sequence of pulses with the high ER and the individual frequency label is generated using an acousto-optic modulator (AOM), or a combination of an AOM and a semiconductor optical amplifier (SOA).

16. The system of claim 12, wherein the probe signal passes through an Erbium-doped-fiber-amplifier (EDFA) and a polarization scrambler (PS) before being launched into the sensing fiber.

17. The system of claim 12, wherein a desired acoustic bandwidth and a total length of the sensing fiber determine a number of sequences of pulses, total length of each sequence of pulses, a time interval between individual pulses, and a rate of interrogation.

18. The system of claim 12, wherein an acoustic aperture length within the sensing fiber is related to a delay set in an interferometer included in a detection section of the controller module to enable homodyne phase demodulation of the backscattered pulses to extract baseband phase information.

19. The system of claim 18, wherein a first heterodyne beat frequency signal produced by a sequence of pulse having a single wavelength is identified and rejected by the detection section of the controller module.

20. The system of claim 19, wherein a second heterodyne beat frequency signal produced by different sequences of pulses having a different wavelengths but identical frequency label is identified and rejected by the detection section of the controller module, wherein the second heterodyne beat frequency is higher than the first heterodyne beat frequency.

* * * * *